United States Patent [19]

Kakuta et al.

[11] Patent Number: 4,727,573
[45] Date of Patent: Feb. 23, 1988

[54] SWITCH WITH PLURAL ROTORS

[75] Inventors: Toshio Kakuta; Tatsuo Kamitani, both of Osaka, Japan

[73] Assignee: Hosiden Electronics Co., Ltd., Japan

[21] Appl. No.: 819,451

[22] Filed: Jan. 16, 1986

[30] Foreign Application Priority Data

Feb. 22, 1985 [JP] Japan ................................ 60-34961
Feb. 22, 1985 [JP] Japan ................................ 60-34962

[51] Int. Cl.$^4$ ........................ H01H 21/04; H04M 1/08
[52] U.S. Cl. .................................. 379/388; 200/1 B; 200/5 R; 379/425
[58] Field of Search ............... 379/388, 425, 422, 424, 379/420; 200/1 B, 1 TK, 6 BB, 5 R

[56] References Cited

U.S. PATENT DOCUMENTS

4,384,177  5/1983  Kakuta ............................... 200/5 R
4,572,930  2/1986  Kakuta et al. ....................... 200/5 R Primary Examiner—Thomas W. Brown
Attorney, Agent, or Firm—Jones, Tullar & Cooper

[57] ABSTRACT

The invention relates to a compact, mechanically operated switch which is especially suitable for use in a telephone set having a loudspeaker receiving function. The switch includes a housing and, disposed therein, a first and a second rotor for opening and closing cooperable contacts and a third rotor for restricting the rotation of the second rotor under a certain condition. All the rotors are disposed in axial alignment with each other. The first and second rotors are urged to rotate in one direction while the third rotor is urged to rotate in the other direction by the action of a force greater than that urging the second rotor to rotate in the one direction. A pushbutton is disposed between the first and second rotors and acts, when depressed, to forcedly rotate them in the other direction so as to establish a loudspeaker receiving circuit. A lock pin cooperates with the pushbutton to lock it in a depressed position. The third rotor includes a lever operatively associated with a handset and having a cam portion which acts to move the lock pin in a manner to unlock the pushbutton when the handset is lifted.

14 Claims, 26 Drawing Figures

SWITCH WITH PLURAL ROTORS

BACKGROUND OF THE INVENTION

The present invention relates to a compact, mechanically operated switch which can selectively control one or more of a plurality of different switching functions and, more particularly, to an improved switch suitable for use as a hook switch in a telephone set.

One recent trend in the telephone set industry is the development of various unique functions for user's convenience in addition to improvements in basic transmitting and receiving functions. For example, telephone sets are known which enable transmitting a call without lifting a handset. Such added function is conventionally implemented purely electrically as by using a separately provided control box having relays. When a specific pushbutton in the telephone set is depressed, the control relays operate to establish a network circuit as well as a loudspeaker receiving circuit, thus enabling transmitting a call without lifting the handset.

However, there are several problems in that such telephone sets equipped with separate control relays are very costly to the extent of preventing their widespread use especially by ordinary households, that there are space constraints in the telephone set for accommodating a separate control box, and that provision of such separate control circuits is essential because of higher voltages and currents used in the telephone set.

SUMMARY OF THE INVENTION

Accordingly, it is an object of the present invention to overcome the aforementioned drawbacks of prior art devices, and to provide an improved switch in which the foregoing added function is implemented by purely mechanical means to alleviate concerns for compatibility with the voltage and current conditions used in the telephone set, and which is inexpensive and capable of ready installation in the telephone set.

Another object of the present invention is to provide a compact and rugged switch which comprises a plurality of rotors provided with coiled springs for biasing them in predetermined directions, each rotor requiring a minimum space for accommodating therein its associated coiled spring without sacrificing the longterm strength thereof.

A further object of the present invention is to provide an improved switch in which a plurality of rotors are disposed within a housing in axial alignment with each other in a manner not to require a large housing.

Still another object of the present invention is to provide a compact switch in which a first and a second rotor can be reliably rotated against the action of their associated coiled springs by depression of a pushbutton.

A still further object of the present invention is to provide an improved switch including a compact and reliable lock mechanism used to lock a pushbutton in a depressed position and to release the same from that position.

Yet another object of the present invention is to provide a compact and inexpensive switch in which a pushbutton can be returned from a depressed position by the action of the coiled springs for rotatably biasing the first and second rotors without the need for a separate spring for returning the pushbutton.

A yet further object of the present invention is to provide a compact switch in which a pushbutton can be reliably returned from a depressed position by operation of a lever.

An additional object of the present invention is to provide an improved switch which permits a quick release of a pushbutton from a depressed or locked position through operation of a lever.

Another object of the present invention is to provide a switch which is especially suitable for use as a hook switch in a telephone set having a loudspeaker receiving function.

A further object of the present invention is to provide a compact and inexpensive switch in which a talk holding function as well as a loudspeaker receiving function can be controlled by purely mechanical means, and which is capable of ready installatuin inside a telephone set.

A still further object of the present invention is to provide an improved switch in which a talk holding pushbutton can be automatically released from a depressed position upon lifting a handset.

A yet further object of the present invention is to provide a switch including a compact lock mechanism for a talk holding pushbutton.

DETAILED DESCRIPTION OF THE PREFERRED EMBODIMENTS

A first embodiment of the present invention is shown in FIGS. 1 to 9, which comprises a switch for use as a hook switch of a telephone set.

Figure 1:
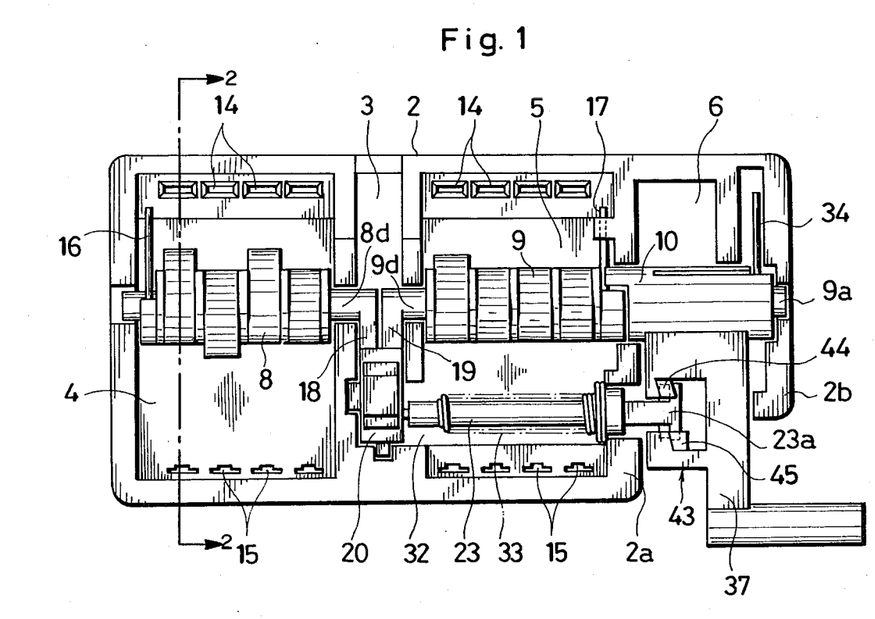
FIG. 1 is a plan view of a switch according to a first embodiment of the present invention with the cover and switch contacts shown removed.

Referring now to FIG. 1, the switch as depicted includes a housing 2 formed of synthetic resin with a cover 1 (shown in FIG. 2) also formed of synthetic resin removed to expose an internal mechanism.

In the housing 2, there are defined a first and a second rotor compartment 4 and 5, a small compartment 3 sandwiched therebetween and a partially open third rotor compartment 6 next to the second rotor compartment 5. The rotor compartments 4, 5 and 6 are provided with a first, a second and a third rotor 8, 9 and 10, respectively, which are formed of synthetic resin and are supported within their respective compartments for rotation about the same axis. The first rotor 8 and the second rotor 9 function to open and close their respective switch contacts (not shown in FIG. 1) depending on their rotational positions. In this embodiment wherein the switch is incorporated in a telephone set, the first rotor 8 serves as an on-off switch to control a loudspeaker receiving function, while the second rotor 9 serves also as an on-off switch for a network function. The third rotor 10 is adapted for rotation upon lifting of a handset (not shown) and one of its functions is to restrict the rotation of the second rotor 9 under a certain condition.

Figure 2:
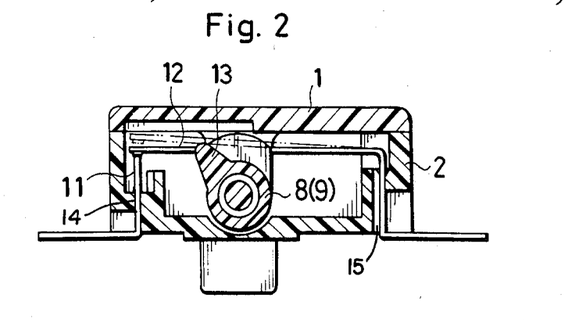
FIG. 2 is a sectional, side-elevational view taken along line 2—2 of FIG. 1 showing the relationship between a rotor and cooperable contacts which are opened and closed by the rotor.

As best seen in FIG. 2, the first and second rotors 8 and 9 are formed with lobes 13 which bring movable contacts 12 into and away from electrical contact with stationary contacts 11 as the rotors 8 and 9 rotate. The number of contact sets and the number, shape and disposition of the lobes 13 are matters of design choice depending upon particular electrical equipment in which a switch of this embodiment is employed and do not form an essential part of the present invention. Therefore, no description of such design details will be given herein, except to show slits 14 and 15 which are adapted to receive therein the stationary contacts 11 and the movable contacts 12.

Figure 4:
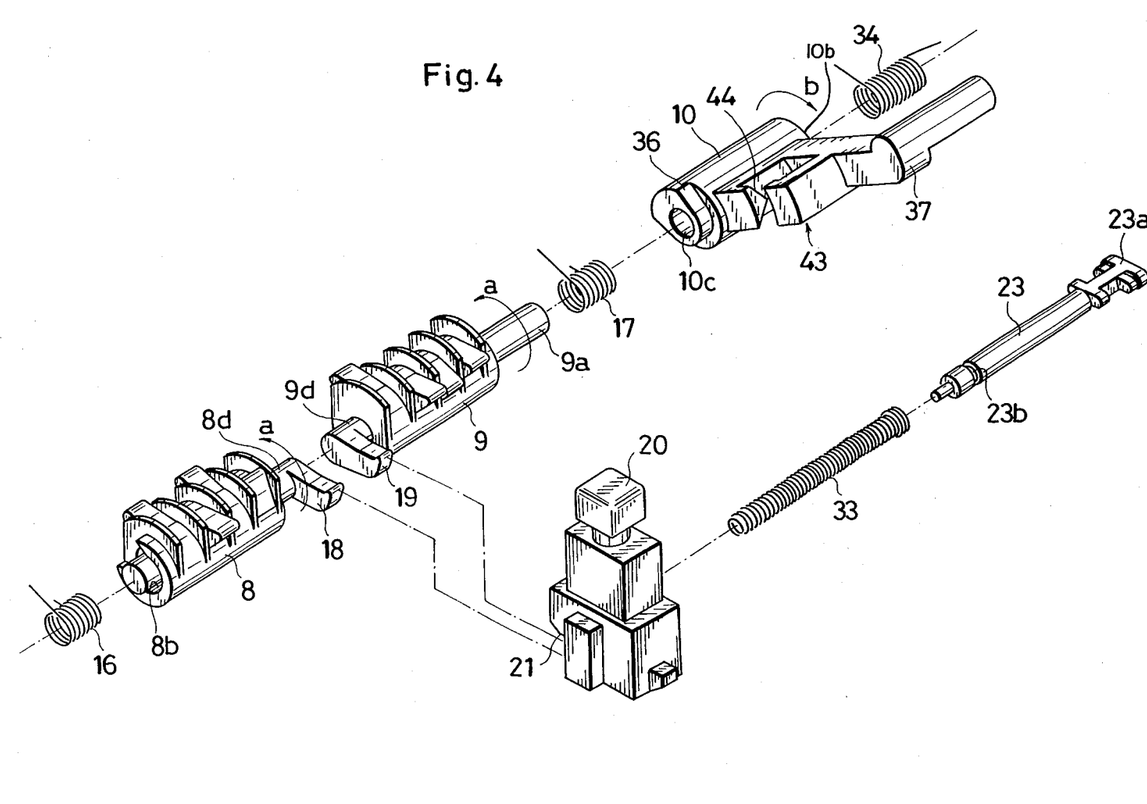
FIG. 4 is an exploded, perspective view showing various major components of the switch.

As shown in FIG. 4, the first rotor 8 includes an annular cavity 8b formed around the longitudinal end opposite to the second rotor 9, which provides a space for accommodating a coiled spring 16. The coiled spring 16 is biased to rotate the first rotor 8 in the direction indicated by arrow "a". Likewise, the second rotor 9 includes an annular cavity formed around the longitudinal end opposite to the first rotor 8 and provides a space similar to the space 8b, which accommodates a coiled spring 17. The coiled spring 17 is biased to rotate the second rotor 9 in the same direction of arrow "a". The third rotor 10 extends in axial alignment with the first and second rotors and includes a circular cavity 10b which provides a space for accommodating a coiled spring 34. The coiled spring 34 is biased to rotate the third rotor 10 in the opposite direction indicated by arrow "b". With the coiled springs 16, 17 and 34 accommodated in the respective spaces within the rotors 8, 9 and 10, it will be possible to eliminate the need to provide a separate space externally of each rotor for accommodating each coiled spring, which not only enhances the compactness of the overall switch structure but also permits an increase in the number of turns of the coiled springs irrespective of space requirements therefor resulting in an adequate spring strength maintained throughout their long service lives.

Figure 7:
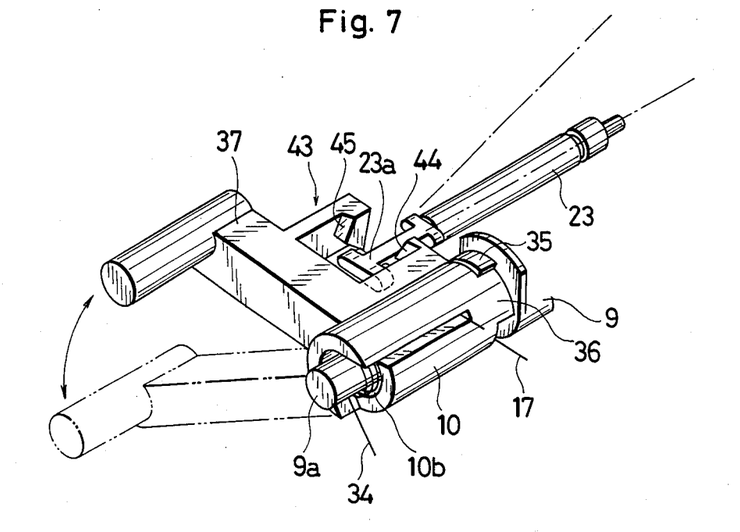
FIG. 7 is a perspective view showing the operative relationship between a first lever and the T-shaped head of the lock pin.

In the illustrated embodiment, a further increase in the compactness of the housing 2 and accordingly the overall switch structure is obtained, as best seen in FIGS. 4 and 7, by providing the second rotor 9 with an integral longitudinal end 9a of a length greater than the axial length of the third rotor 10, while forming the third rotor 10 with a through-hole 10c for receiving the longitudinal end 9a of the second rotor 9 for rotation therein, the coiled springs 17 and 34 being fitted on the longitudinal end 9a for receipt in their respective accommodating spaces, the protruding end of the longitudinal end 9a being rotatably supported with respect to the outer wall 2b of the housing 2.

Figure 5:
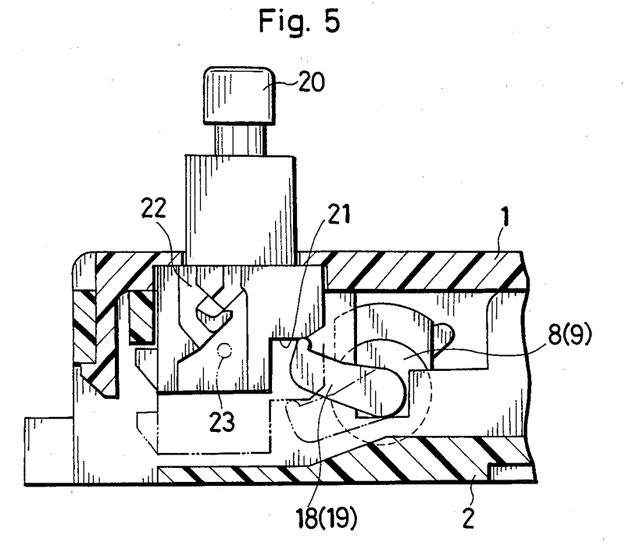
FIG. 5 is a sectional, side-elevational view of a loudspeaker receiving pushbutton operated by the rotors.

The first and second rotors 8 and 9 have the other longitudinal ends 8d and 9d, respectively, which extend into the small compartment 3 toward each other and are formed integrally with radially extending tongues 18 and 19, respectively. These tongues 18 and 19 extend generally horizontally under a pushbutton 20 so that depression of the pushbutton 20 will rotate the tongues and accordingly the first and second rotors in a manner to be described below. As best seen in FIG. 5, the pushbutton 20 has a base step portion 21 adapted to be contacted by the tips of the tongues 18 and 19. Since the coiled springs 16 and 17 act to urge the first and second rotors 8 and 9 and accordingly their tongues 18 and 19 to rotate in the direction of arrow "a", the pushbutton 20 is normally kept in a raised, non-depressed position. When the pushbutton 20 is depressed, the tongues 18 and 19 are rotated in a counter-clockwise direction as viewed in FIG. 5 against the action of the coiled springs 16 and 17. Release of the pushbutton 20 will bring it to the raised position by the action of the coiled springs 16 and 17. Although not specifically shown, there are provided individual electrical circuits associated with the loudspeaker receiving function and the network function and adapted to be controlled by the opening and closing of switch contacts depending upon the rotational positions of the first and second rotors. The loudspeaker receiving circuit as well as the networking circuit is completed, or becomes operational, by the depression of the pushbutton 20 to rotate the first and second rotors 8 and 9 in the direction opposite to arrow "a".

The pushbutton 20 includes a heart cam mechanism for locking it in the depressed position by initial depression thereof and for unlocking it to return to the normal raised position by subsequent depression thereof. This heart cam mechanism comprises a heart cam groove 22 formed in one side surface of the pushbutton 20 and a lock pin 23 adapted to be inserted into the groove 22.

Figure 6A:
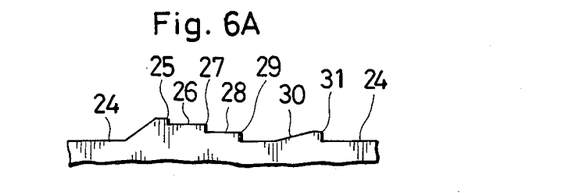
FIG. 6A is a schematic view useful for explaining the configuration of a heart cam groove formed in one side of the loudspeaker receiving pushbutton.

The operation of this heart cam mechanism will be described below with reference to FIGS. 6A and 6B. When the pushbutton 20 is depressed from the initial raised position, this means that the lock pin 23 rises along a first groove portion 24 of the heart cam groove 22. The lock pin enters a second inclined groove portion 26 having a step 25 relative to the first groove portion 24 when the pushbutton is fully depressed. Upon release of the pushbutton 20, the lock pin 23 starts to move down along the second inclined groove portion 26 and comes into engagement with a generally U-shaped stop 28 which is of greater depth than the second groove portion 26 by a step 27. In this condition, the pushbutton 20 is locked to prevent it from returning to the normal raised position. Thus, this locked position is at an intermediate point between the normal raised position and the fully depressed position of the pushbutton. When the pushbutton 20 is again depressed, the lock pin 23 moves upwardly from the stop 28, enters a third groove portion 30 having a step 29 relative to the stop 28. Thereafter, the pushbutton 20 is released which causes the lock pin 23 to move down along the third groove portion 30 and to enter the first groove portion 24 through a step 31. It will be readily understood that the steps 25, 27, 29, 31 serve to prevent the lock pin 23 from moving in the reverse direction.

As shown in FIG. 1, the lock pin 23 is disposed in the second rotor compartment 5 parallel to the second rotor 9. The fore end of the lock pin 23 is inserted in the heart cam groove 22 by way of an opening 32 provided in a partition wall of the housing, and the other end of the lock pin, i.e., its head portion 23a extends through an outer wall 2a of the housing to project externally thereof. This projecting pin head 23a is generally T-shaped as best shown in FIG. 4. A coiled spring 33 is mounted on the lock pin 23 to urge it into engagement with the heart cam groove 22, and has one end affixed to a shank portion 23b near the fore end of the lock pin, the other end of the coiled spring 33 being urged against the inside wall of the housing 2.

It should be noted, in this connection, that since the lock pin 23 moves laterally as well as axially during the locking and unlocking of the pushbutton 20, the opening 32 has a diameter larger than that of the lock pin 23 so as not to interfere with such lock pin movements.

Figure 8:
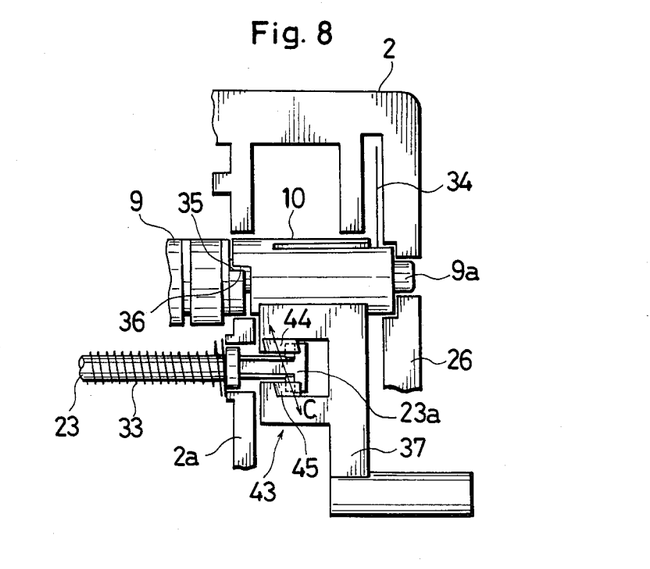
FIG. 8 is a top plan view of the first lever and the T-shaped head of the lock pin.

The coiled spring 34 which urges the third rotor 10 to rotate in the direction of arrow "b" as shown in FIG. 4 has a greater strength than that of the coiled spring 17 associated with the second rotor 9 urging the third rotor to rotate in the opposite direction. Also, both the second and third rotors 9 and 10 include latch means 35 and 36, respectively, for effecting latching engagement between the second and third rotors when they are rotated in the direction of arrow "b", as best seen in FIGS. 7 and 8. Accordingly, it should be noted that the second rotor 9 is forced to rotate with the third rotor 10 when it is rotated in the direction of arrow "b" under the influence of the coiled spring 34.

Figure 3:
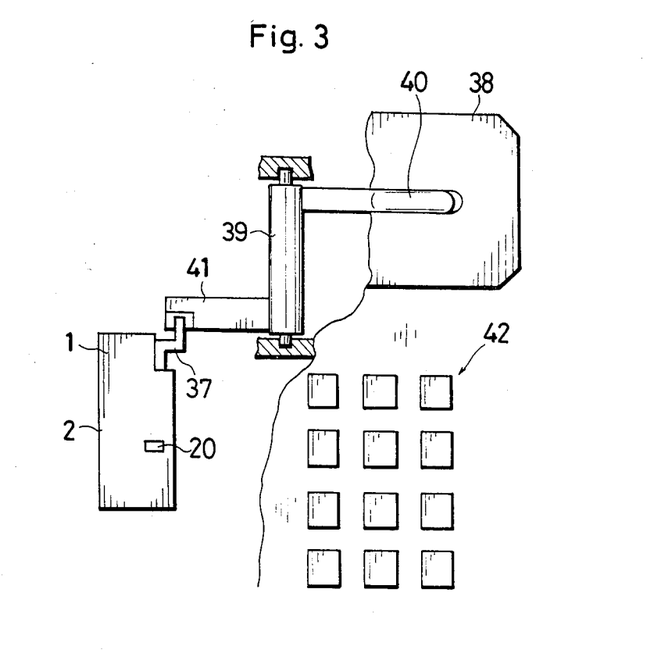
FIG. 3 is a schematic, partially cut away plan view of part of a telephone set illustrating the switch used in a telephone set as a hook switch.

The third rotor 10 includes a first lever 37 integrally formed therewith and extending radially which causes the third rotor to rotate in response to lifting the handset. As shown in FIG. 3, a base set 38 has a shaft 39 pivotally supported thereon, and the shaft 39 includes an operating lever 40 and a set lever 41 both integrally formed therewith. The operating lever 40 and the set lever 41 are operatively associated with the handset and the first lever 37, respectively. When the handset is placed on the base set 38, the operating lever 40 is held in the lowered position so that the set lever 41 assumes its raised position. Thus, the first lever 37 is in the raised position as indicated by the solid line in FIG. 7. When the handset is lifted, the operating lever 40 is raised and the first lever 37 is thus lowered to the position as indicated in the broken line in FIG. 7 by the action of the coiled spring 34 associated with the third rotor 10. Reference numeral 42 designates pushbuttons for dialing.

The first lever 37 has integrally formed therewith a cam portion 43 which is generally C-shaped as viewed in FIG. 8. Angled tapered cam surfaces 44, 45 are formed inside each open end of the cam portion 43 as best seen in FIG. 7. The T-shaped head 23a of the lock pin 23 comes into abutting engagement with the tapered cam surfaces 44, 45 during the rotation of the first lever 37. As the first lever 37 rotates, the tapered cam surfaces 44, 45 thereof abut the T-shaped head 23a of the lock pin either from above or below, which causes the lock pin 23 to slide in a direction tending to withdraw itself from the heart cam groove 22 against the action of the coiled spring 33. The lock pin 23 returns to its original position when the T-shaped head 23a passes a ridge between the merging tapered cam surfaces 44, 45.

Figure 6B:
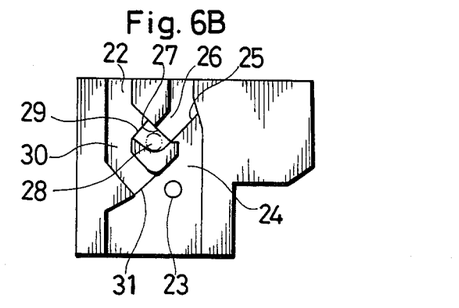
FIG. 6B is a schematic view showing the relationship between the heart cam groove of FIG. 6A and a lock pin extending into the groove.

In this connection, it should be understood that the withdrawal of the lock pin 23 from the heart cam groove 22 unlocks the pushbutton 20 and that in order to permit a reliable and quick unlocking or release of the pushbutton 20 from the locked position, the lock pin 23 should preferably slide laterally to smoothly move its fore end from the stop 28 to the third groove portion 30 as best seen in FIG. 6B. For this reason, and as is best seen in FIGS. 7 and 8, two pairs of the tapered cam surfaces 44, 45 are not arranged perpendicular but at an oblique angle to the axis of the lock pin 23, as indicated by arrow "c" in FIG. 8, so as to cause a lateral movement of the lock pin 23 upon abutting the cam portion 43. It should be understood further that it may be possible to unlock the pushbutton 20 by causing the lock pin 23 to move laterally without its concomitant axial sliding movement.

In operation, the handset is placed on the base set 38 when the telephone set is not in use. In this condition, the first lever 37 which moves with the operating lever 40 is in the raised position. This means that the third rotor 10 has been rotated to the position shown in FIG. 7 against the action of the coiled spring 34. Thus, the coiled spring 34 does not exert a force upon the second rotor 9 tending it to rotate in the direction opposite to that indicated at "a", so that this second rotor 9 and the first rotor 8 can freely rotate in the direction of arrow "a" under the influence of the coiled springs 16 and 17. This will cause the tongues 18 and 19 of the first and second rotors 8 and 9 to raise the pushbutton 20 to the position shown in FIG. 9A. In this condition, the loudspeaker receiving circuit is disabled or in an inoperative state, and so is the network circuit.

Figure 9A:
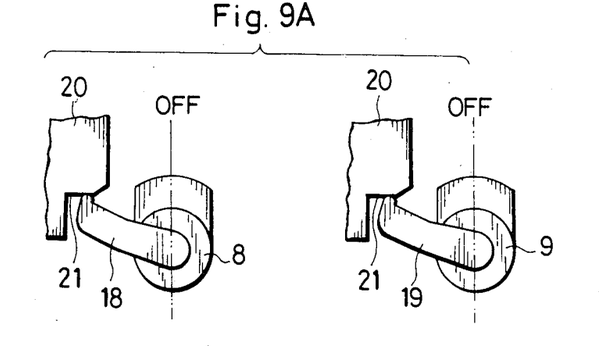
FIGS. 9A, 9B, and 9C are schematic views useful for explaining the operative relationship between the loudspeaker receiving pushbutton and the first and second rotors.
Figure 9B:
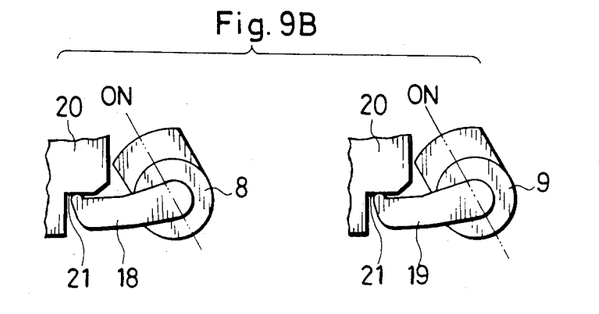

Then, when the pushbutton 20 is depressed, it becomes locked by the operation of the lock pin 23, keeping the tongues 18 and 19 and accordingly the first and second rotors 8 and 9 in the positions shown in FIG. 9B to establish or enable the loudspeaker receiving circuit as well as the network circuit thus making it possible to place a telephone call. It should be understood that since the network circuit can be enabled while holding the handset on the base set 38, it is possible to make a call by a single hand.

Figure 9C:
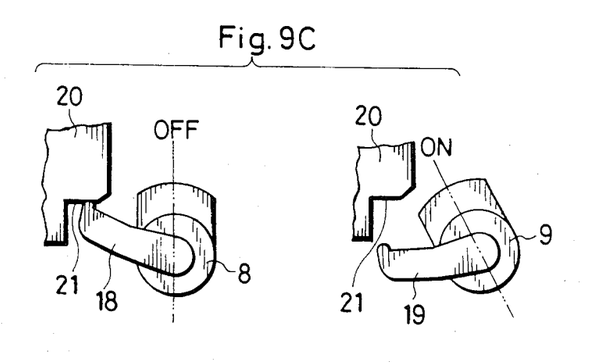

The handset is then lifted after a confirmation is made that a telephone connection has been established, by listening to an audio or voice signal coming out of the loudspeaker (not shown). When this occurs, the first lever 37 and accordingly the third rotor 10 are rotated in the direction of arrow "b" in FIG. 4 by the action of the coiled spring 34, bringing the tapered cam surfaces 44, 45 into abutting engagement with the head 23a of the lock pin 23 from above. This will cause the lock pin 23 to slide axially in a righthand direction as viewed in FIG. 8 and, at the same time, to move laterally, unlocking the pushbutton 20. As a result the pushbutton 20 is raised to the non-depressed position to allow the first rotor 8 to rotate in the direction of arrow "a" by the action of the coiled spring 16, thereby disabling the loudspeaker receiving circuit. However, since the coiled spring 34 associated with the third rotor 10 is of greater strength than the coiled spring 17 associated with the second rotor 9 and because of the provision of the latch means 35 and 36 in these rotors, the second rotor is rotated along with the third rotor 10 in the direction of arrow "b" by the action of the coiled spring 34, instead of following the first rotor 8 which rotates in the direction of arrow "a", as shown in FIG. 9C. Thus, the network circuit remains in the "enabled" state in which it is possible to keep on talking through the handset.

When the handset is replaced on the base set 38 after talking is completed, the second and third rotors 9 and 10 rotate to their respective initial positions shown in FIG. 9A disabling both the loudspeaker receiving and the network circuits.

When the handset is lifted in response to an incoming call, the first and second rotors 8 and 9 assume the positions shown in FIG. 9C to enable the network circuit only.

In the foregoing, the present invention has been described in detail with reference to a telephone switch of the type capable of controlling the loudspeaker receiving function and the network function, wherein depression of a pushbutton rotates a first and a second rotor in one direction toward their "ON" positions to enable both the loudspeaker receiving circuit and the network circuit thereby enabling making a call with the handset held on the base set. Lifting the handset upon connection will release a first lever attached to a third rotor and thus rotate the third rotor so that the cam surfaces provided in the first lever causes a movement of a lock pin to unlock the pushbutton disabling the loudspeaker receiving circuit, while causing the second rotor to rotate with a third rotor rather than returning to its original position upon unlocking of the pushbutton, thereby maintaining the network circuit in the "enabled" condition. Thus, it is possible to make a call by simple depression of the pushbutton by a single hand, followed by lifting of the handset which disables only the loudspeaker receiving circuit. As will be understood, the above-described basic and auxiliary functions are implemented by pure mechanical means in accordance with the present invention which provides a compact and inexpensive switch arrangement which is adapted for easy installation within a base set without the need for a separate bulky control box for accommodating the switch and which has no compatibility problems with certain voltages and currents used in the telephone set.

Referring now to FIGS. 10 through 17F, there is illustrated a second embodiment of the present invention which is similar to the foregoing first embodiment in being applicable to a switch for use as a hook switch in a telephone set. However, this embodiment is characterized by the addition of a talk holding function to the loudspeaker receiving function implemented by the first embodiment. In these figures, like parts are designated by the same reference numerals as used in the foregoing first embodiment (FIG. 1 through FIGS. 9A to 9C).

Figure 10:
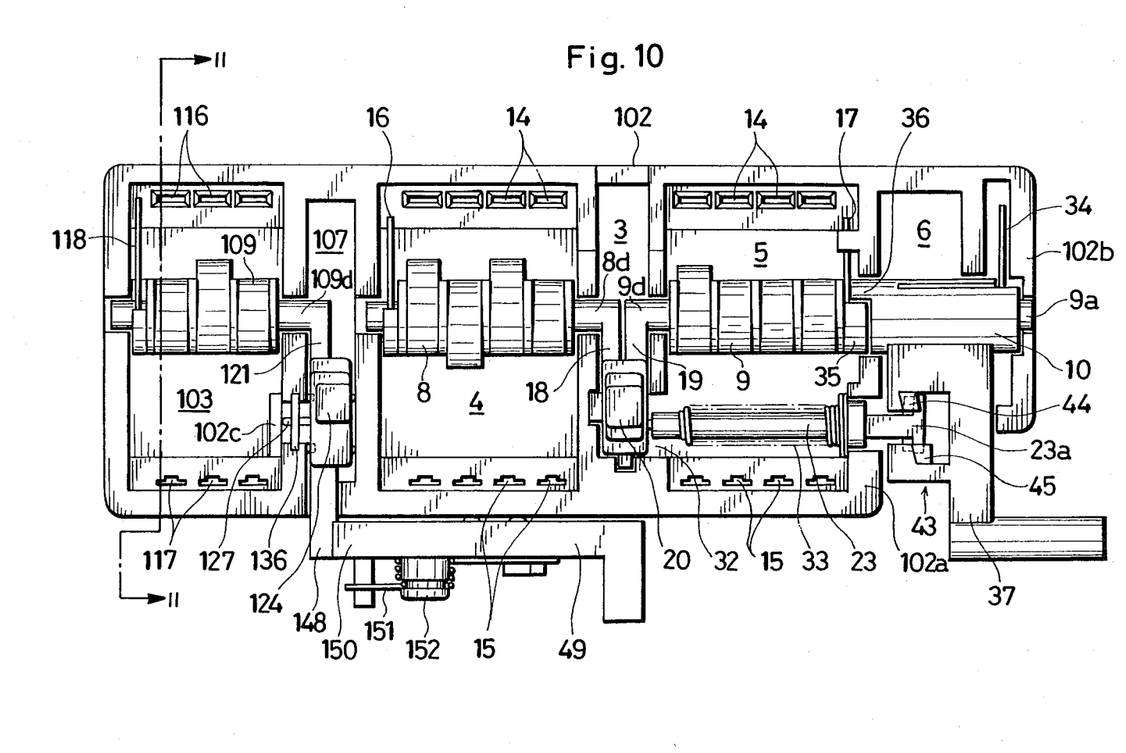
FIG. 10 is a plan view of a switch according to a second embodiment of the present invention which has a talk holding function with the cover and switch contacts shown removed.
Figure 11:
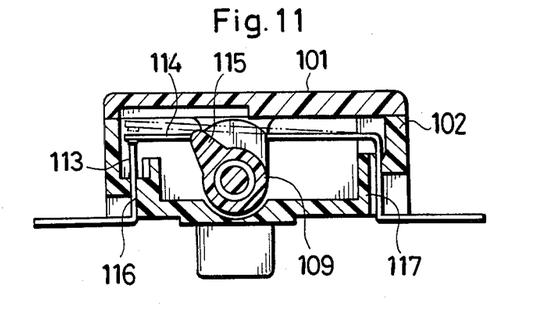
FIG. 11 is a sectional side-elevational view taken along 11—11 of FIG. 10, showing a fourth rotor and cooperable contacts to be controlled thereby.

In FIG. 10, the switch includes a housing 102 formed of synthetic resin whose cover 101 (shown in FIG. 11) formed also of synthetic resin has been removed to expose an internal structure. The housing 102 has defined therein four rotor compartments 4, 5, 6 and 103 and small compartments 3 and 107 as well. The samll compartments 3 and 107 are respectively formed between the first rotor compartment 4 and the second rotor compartment 5 and between the first rotor compartment 4 and the fourth rotor compartment 103. The rotor compartments 4, 5, 6 and 103 include rotors 8, 9, 10 and 109, respectively, which are formed of synthetic resin and are disposed in axial alignment but capable of independent rotation within the housing. The fourth rotor 109 serves as a switch for on-off control of the talk holding function, the first rotor 8 as a switch for on-off control of the loudspeaker receiving function, and the second rotor 9 as a switch for on-off control of the network function. As in the first embodiment, the third rotor 10 is rotated in response to lifting of a handset (not shown) and serves to restrict the rotation of the second rotor 9 under a certain condition. As shown in FIG. 11, the fourth rotor 109 also includes a lobe 115 which brings a movable contact 114 into and away from electrical engagement with a stationary contact 113 as the fourth rotor 109 rotates. Slits 116 and 117 are formed in the housing for mounting therein the stationary and movable contacts 113 and 114, respectively.

The fourth rotor 109 includes a longitudinal end extending in the direction opposite to the first rotor 8 and an annular cavity 109b formed around the longitudinal end to receive therein a coiled spring 118 which urges the fourth rotor 109 in the direction of arrow "a". The other longitudinal end 109d of the fourth rotor 109 extends into the small compartment 107 and includes a tongue 121 integrally formed therewith and extending radially outwardly beneath a pushbutton 124 so that depression thereof will rotate the fourth rotor 109 in the direction opposite to arrow "a". The pushbutton 124 is movably mounted in the small compartment 107 and serves to control the talk holding function. As shown in FIGS. 17A to 17F, the tongue 121 of the fourth rotor 109 is in contact with a base step portion of the talk holding pushbutton 124 at all times. Normally the tongue keeps the pushbutton 124 in the raised position by the action of the coiled spring 118. When the pushbutton 124 is depressed, the fourth rotor 109 is rotated in the direction opposite to arrow "a" against the action of the coiled spring 118 to enable the talk holding circuit, i.e., to set the talk in a "hold" state.

The talk holding pushbutton 124 includes a heart cam mechanism similar to that described with reference to FIGS. 5, 6A and 6B. This heart cam mechanism comprises a heart cam groove 126 formed in one side surface of the pushbutton 124 and a lock pin 127 having its fore end disposed within this groove. When the pushbutton 124 is depressed from the raised position, this means that the lock pin 127 rises relative to the heart cam groove as viewed in FIG. 14B and passes along a first groove portion 128 until the lock pin comes into engagement with a second inclined groove portion 130 which borders the first groove portion 128 through a step 129. In this condition, the pushbutton 124 is released to allow the lock pin 127 to move through the second groove portion 130 into a U-shaped stop 132 which comprises a groove of greater depth than the second groove 130. This U-shaped stop 132 serves to prevent the pushbutton 124 from returning to the raised position. When the pushbutton 124 is depressed again, the lock pin 127 moves upwardly out of the U-shaped stop 132, and enters a third groove portion 134 bordering the stop 132 through a step 133. Release of the pushbutton 124 will lower the lock pin 124 along the third groove portion 134 and return to the first groove portion 128 through a step 135. Needless to say, the steps 129, 131, 133 and 135 serve to prevent the lock pin 127 from moving in the reverse direction.

Figure 13:
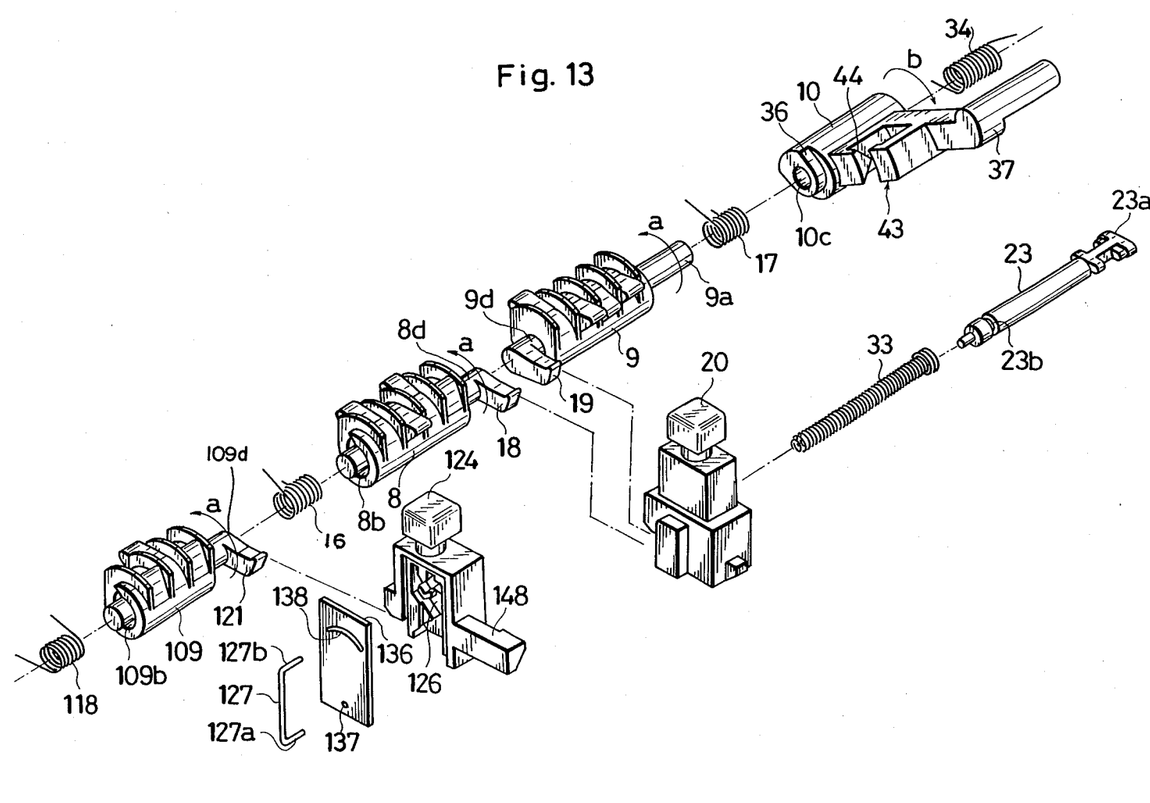
FIG. 13 is a view similar to FIG. 4, showing various major components of the switch shown in FIG. 10.
Figure 14A:
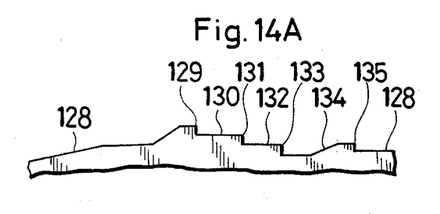
FIG. 14A is a view similar to FIG. 6A, showing a heart cam groove formed in one side surface of a talk holding pushbutton.
Figure 14B:
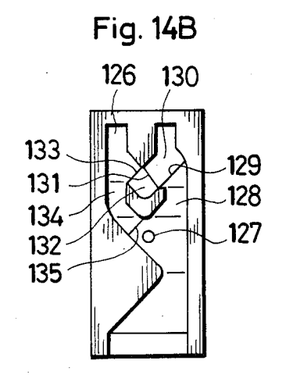
FIG. 14B is a view similar to FIG. 6B, showing the heart cam groove and a lock pin extending into the groove.
Figure 15:
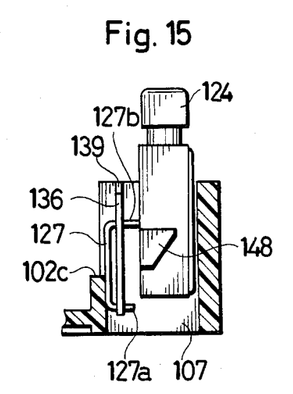
FIG. 15 is a view similar to FIG. 5, showing the talk holding pushbutton and a C-shaped pin for keeping the pushbutton in a locked position.
Figure 16:
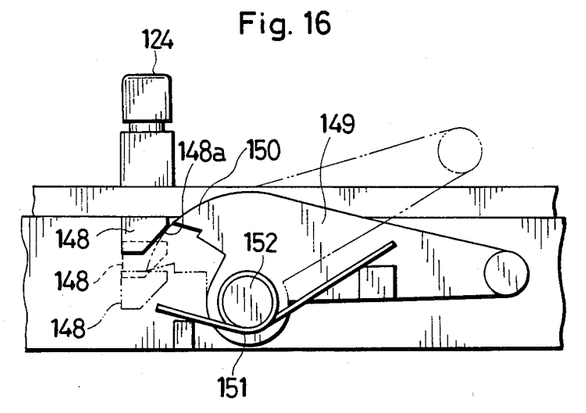
FIG. 16 is a side elevational view of the talk holding pushbutton and a second lever operatively associated therewith.

The lock pin 127 comprises a generally C-shaped metal member as best seen in FIGS. 13 and 15. As shown, the metal member 127 has a lower end portion 127a adapted for insertion into a circular hole 137 formed in a holding plate 136, and an upper end portion 127b adapted for insertion into an arcuate slit 138 formed in the upper portion of the holding plate 136. When mounted on the holding plate 136, the C-shaped metal member 127 is capable of limited rotation about the lower end portion thereof along the locus defined by the arcuate slit 138. The holding plate 136 is mounted in a groove 139 formed in the housing 102 to cover or face the side surface of the pushbutton 124 where the heart cam groove 126 is formed, and also to ensure that the upper end portion 127b of the metal member 127 is disposed in the heart cam groove 126. Another holding plate 102c is provided behind the holding plate 136 to hold the C-shaped metal member 127 in place between both plates, as is best seen in FIGS. 10 and 15. This arrangement permits the lock pin 127 to move laterally to follow the heart cam groove 126 thereby locking and unlocking the pushbutton 124.

The heart cam mechanism provided by the pushbutton 20 and the lock pin 33 to control the loudspeaker receiving function is the same as described with reference to the foregoing first embodiment.

The talk holding pushbutton 124 also includes an arm 148 formed integrally therewith and extending therefrom externally of the housing 102. To cooperate with this arm 148, a second lever 149 is mounted on the outer side surface of the housing 102 adjacent the arm 148 for pivotal movement about a pin 152. The second lever 149 has a hook 150 provided at one end thereof and is urged to rotate in a clockwise direction as viewed in FIG. 16 by the action of a coiled spring 151 to thereby bring the hook 150 away from engagement with the arm 148. When the pushbutton 124 is in the non-depressed, raised position, the second lever 149 can be rotated in a counter-clockwise direction as viewed in FIG. 16 against the action of the coiled spring 151 without causing the hook 150 to abut the arm 148 due to the provision of a tapered surface of the arm. When the pushbutton 124 is in the locked position shown in the broken line in FIG. 16, such counter-clockwise rotation of the second lever 149 will bring the hook 150 into engagement with the arm 148 from above and cause the arm to move downwardly.

Figure 12:
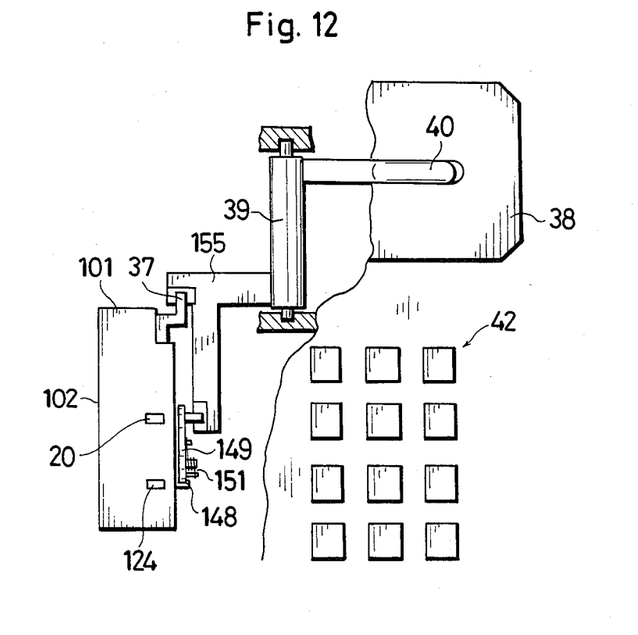
FIG. 12 is a schematic partial cutaway plan view similar to FIG. 3, showing the switch of FIG. 10 provided in a telephone set as a hook switch.

Referring to FIG. 12, a base set 38 includes a shaft member 39 mounted thereon for rotation in response to lifting and replacing of the handset (not shown). The shaft member 39 has attached thereto an operating lever 40 which is operatively associated with the handset and a set lever 155 which extend radially and axially to engage two levers 37 and 149 from below. When the handset is placed on the base set 38, the operating lever 40 is lowered causing the set lever 155 to push up both levers 37 and 149 against the action of coiled springs 34 and 151. When the handset is lifted from the base set 38, the operating lever 40 is raised by the action of the coiled springs 34 and 151 which lower the levers 37 and 149.

Figure 17A:
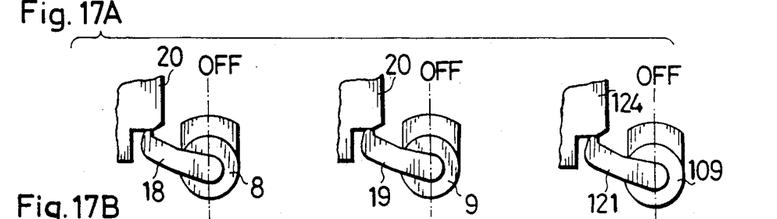
FIGS. 17A through 17F show the operative relationships between the loudspeaker receiving pushbutton and the first and second rotors and between the talk holding pushbutton and the fourth rotor.

In operation, when the handset is placed on the base set 38, the first and second levers 37 and 149 are in their raised positions, which means that the third rotor 10 has been rotated in the durection opposite to arrow "b" against the action of the coiled spring 34. Thus, the second rotor 9 is subject to the action of its associated coiled spring 17 only so that the pushbutton 20 is kept in the raised position by the joint actions of the coiled springs 17 and 18 which urge their associated tongues 19 and 18 to raise the pushbutton 20, as shown in FIG. 17A. In this condition, both the loudspeaker receiving circuit and the network circuit are disabled. On the other hand, the coiled spring 118 urges the fourth rotor 109 to rotate in the direction of arrow "a", keeping the pushbutton 124 in the raised position. This will allow the second lever 149 to rotate in the counter-clockwise direction as viewed in FIG. 16, causing the hook 150 to come under the arm 148 of the pushbutton 124. Hence, it will be appreciated that the talk holding circuit is also disabled.

When the pushbutton 20 for controlling the loudspeaker receiving function is depressed, the pushbutton becomes locked by the operation of the lock pin 23. This will also rotate the first and second rotors 8 and 9 to the positions shown in FIG. 17B, in which the loudspeaker receiving circuit and the network circuit are established to enable making a call. It will be appreciated that since the network circuit becomes enabled with the handset placed on the base set 38, it is possible to make a call by using a single hand.

Upon connection, the other party's voice signal is sent back through the loudspeaker allowing the caller to confirm that he is connected to that party. Then the handset is lifted causing the first lever 37 and accordingly the third rotor 10 to rotate in the direction of arrow "b" by the action of the coiled spring 34. During such rotational movement, the tapered cam surfaces 44 and 45 of the first lever 37 come into abutting engagement from above with the T-shaped head 23a of the lock pin 23 to unlock the pushbutton 20. When this occurs, the pushbutton 20 returns to the raised position allowing the first rotor 8 to return to its original position thereby disabling the loudspeaker receiving circuit. On the other hand, the second rotor 9 does not follow the first rotor 8 which rotates upon return of the pushbutton 20 to the raised position, since the second rotor 9 cannot rotate in the direction of arrow "a" independently of the third rotor 10 due to the provision of latches 35 and 36 formed therein and also since the coiled spring 34 is of greater strength than the coiled spring 17. Accordingly, the network circuit remains enabled causing no interruption of the call. It should also be noted that the second lever 149 has been rotated to the position where the hook 150 does not stand in the way of the arm 148 of the pushbutton 124 thus enabling the depression thereof.

Figures 17B, 17C:
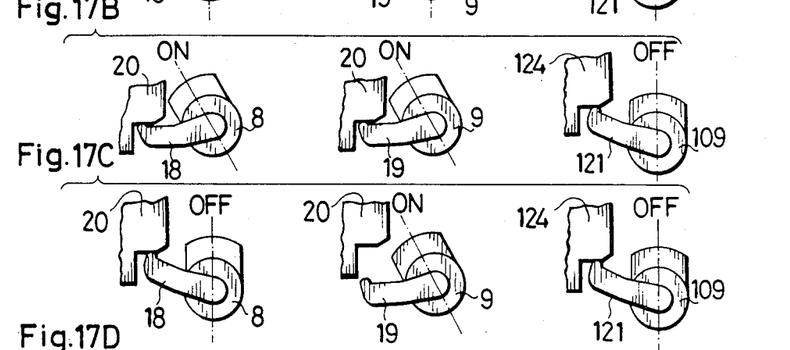
Figures 17D, 17E, 17F:
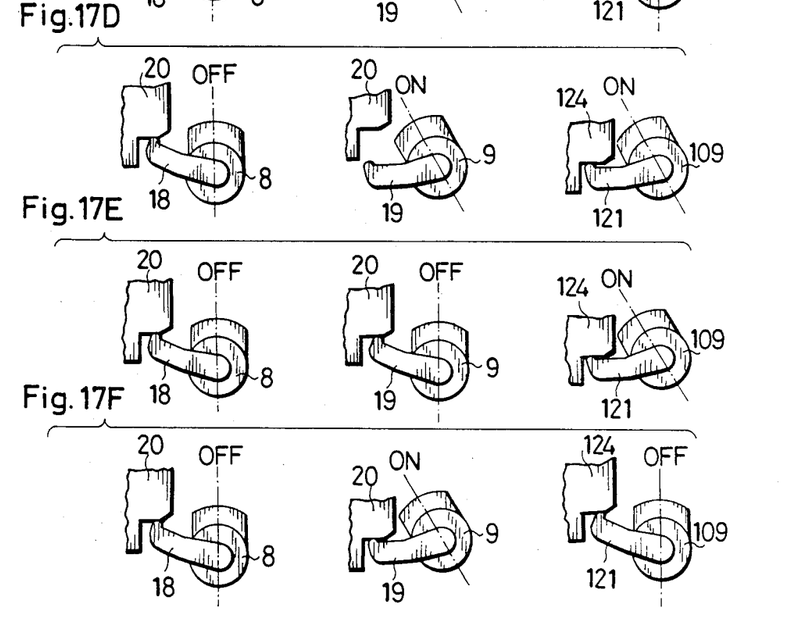

When the talk holding pushbutton 24 is depressed during the talking, the pushbutton becomes locked and the fourth rotor 109 is rotated to the position shown in FIG. 17D to establish the talk holding circuit. Then, replacing the handset on the base set 38 will raise the first and second levers 37 and 149, causing the third rotor 10 to rotate to the position shown FIG. 17E against the action of the coiled spring 34. This will unlatch the second rotor 9 from the third rotor 10 to allow the second rotor to rotate in the direction of arrow "a" thereby disabling the network circuit. On the other hand, the second lever 149 is rotated in the counterclockwise direction as viewed in FIG. 16 against the action of the spring 151 so that the hook 150 comes into engagement with the latch formed in the arm 148 and lowers the arm and accordingly the pushbutton 124 from the locked position indicated by the broken line to the fully depressed position indicated by the dot-chain line in FIG. 16. In this condition, the pushbutton 124 is unlocked but cannot return to the raised position because the second lever 149 remains in the position indicated by the dot-chain line in FIG. 16. Thus, the fourth rotor 109 cannot return to the position shown in FIG. 17A so that the talking is kept in the "hold" state.

When the handset is lifted again, the first and second levers 37 and 149 are lowered, causing the third rotor 10 to rotate the second rotor 9 to the position shown in FIG. 17F, so that the network circuit is established enabling resumption of the call. This will also release the pushbutton 124 from latching engagement with the hook 150, allowing the pushbutton to return to the raised position where the talk holding circuit is disabled. Thereafter the handset is replaced on the base set 53 upon completion of the call, which resets the rotors 8, 9 and 109 to the initial positions shown in FIG. 17A.

It should also be appreciated that when the handset is lifted in response to an incoming call, the rotors 8, 9 and 109 assume the positions shown in FIG. 17C where only the network circuit is established.

As has been described above, the switch of this second embodiment permits a resumption of the call through relifting of the handset after the talk holding pushbutton is depressed followed by replacing the handset, since such replacement of the handset will cause the second lever to keep the pushbutton in the lowest but unlocked position maintaining the network circuit in the talk holding state. Furthermore, it should be understood that such talk holding function as well as the loudspeaker receiving function can be implemented by a purely mechanical switch mechanism which is inexpensive to manufacture and easy to install in the base set thus requiring no bulky control box therefor as is usual with prior art arrangements, and does relieve concerns about compatibility with certain voltages and currents used in the telephone set. It should be understood that while the switch arrangement shown in FIGS. 10 and 13 incorporates in a single housing a plurality of rotors for controlling the talk holding function, the network function and the loudspeaker receiving function, it is possible to provide a separate housing for accomodating the switch mechanism associated with the talk holding function.

As the present invention may be embodied in several forms without departing from the spirit of the essential characreristics thereof, the foregoing embodiments are therefore illustrative only and not restrictive, since the scope of the invention is defined by the appended claims rather than by the preceeding description, and all changes that fall within meets and bounds of the claims, or equivalence of such meets and bounds are therefore intended to be embraced by the claims.

What is claimed is:

1. A switch for selectively controlling one or more of a plurality of different switching functions, comprising a housing, a first and a second rotor disposed within the housing and operable to open and close cooperable contacts, the first and second rotors being urged to rotate in one direction, a third rotor disposed within the housing and urged to rotate in the other direction by a force greater than that urging the second rotor to rotate in the one direction, the first, second and third rotors being disposed in axial alignment with each other, the second and third rotors including latch means for effecting latching engagement therebetween to forcedly rotate the second rotor with the third rotor upon rotation thereof in the other direction, a first lever attached to the third rotor to rotate it in the one direction, a first pushbutton disposed between the first and second rotors and operable to rotate them in the other direction upon depression of the pushbutton, and a lock pin operatively associated with the first pushbutton to lock it when the pushbutton is depressed, the first lever including a cam portion cooperating with the lock pin and operable to move it away from the first pushbutton to release it from the locked position during rotation of the first lever.

2. A switch according to claim 1 wherein the first rotor includes an annular cavity formed around one longitudinal end opposite to the second rotor and adapted to receive therein a first coiled spring urging the first rotor to rotate in the one direction, the second rotor includes an annular cavity formed around one longitudinal end opposite to the first rotor and adapted to receive therein a second coiled spring urging the second rotor to rotate in the one direction, and the third rotor includes an axial hole adapted to receive therein a third coiled spring adjacent the end opposite to the second rotor.

3. A switch according to claim 2 wherein the longitudinal end of the second rotor opposite to the first rotor is of a length greater than the axial length of the third rotor so that when the longitudinal end of the second rotor is inserted into the hole of the third rotor for rotation therein, a portion of the longitudinal end projects from the end opposite to the second rotor, the third coiled spring being fit on the longitudinal end of the second rotor for disposition in the hole of the third rotor.

4. A switch according to claim 1 wherein the longitudinal ends of the first and second rotors adjacent to each other include a pair of radially extending tongues formed integral therewith and operatively associated with the first pushbutton in such a manner that depression of the pushbutton will rotate the first and second rotors in the other direction against the action of the force urging the rotors to rotate in the one direction.

5. A switch according to claim 4 wherein the the lock pin has a fore end, and wherein the first pushbutton has a heart cam groove formed in the side surface facing the first lever and adapted to receive therein the fore end of the lock pin.

6. A switch according to claim 5 wherein the first pushbutton is urged toward a raised position through the tongues of the first and second rotors by the combined action of the forces urging the rotors to rotate in the one direction.

7. A switch according to claim 5 wherein the lock pin further has a T-shaped head adapted to engage the cam portion of the first lever during the rotation thereof, the cam portion of the first lever being generally C-shaped having open ends with each of its open ends being formed to include a pair of merging tapered cam surfaces, whereby the rotation of the first lever brings its tapered cam surfaces into abutting engagement with the T-shaped head of the lock pin and moves it away from the heart cam groove of the first pushbutton to unlock it.

8. A switch according to claim 7 wherein the two pairs of tapered cam surfaces of the first lever are arranged at an oblique angle to the axis of the third rotor to cause the lock pin to move laterally as well as axially during the rotation of the first lever thereby permitting a quick release of the first pushbutton from the locked position.

9. A switch according to claim 8 wherein the first rotor is operable to open and close cooperable contacts associated with a loudspeaker receiving circuit, and the second rotor is operable to open and close cooperable contacts associated with a circuit for enabling calls through a handset.

10. A switch according to claim 9 further comprising a fourth rotor disposed within the housing and operable to open and close cooperable contacts associated with a talk holding circuit, the fourth rotor being disposed generally in axial alignment with the first rotor and being urged to rotate in the one direction, and a second pushbutton operatively associated with the fourth rotor to rotate it in the other direction upon depression of the second pushbutton, the second pushbutton including means for locking it in a depressed position and for releasing it from the locked position upon re-depression of the pushbutton.

11. A switch according to claim 10 further comprising a second lever operatively associated with the handset and the second pushbutton in such a manner that when the handset is replaced the second lever operates to further lower the second pushbutton from the locked position and further that when the handset is lifted the second lever is allowed to rotate in a direction to release the second pushbutton into the raised, non-depressed position.

12. A switch according to claim 11 wherein the first and second levers are operatively associated with the handset in such a manner that the weight of the handset will normally rotate each of the first and second levers in a direction opposite to that in which it is urged to rotate.

13. A switch according to claim 12 wherein the fourth rotor includes an annular cavity formed around the longitudinal end opposite to the first rotor and adapted to receive therein a coiled spring urging the fourth rotor to rotate in the one direction.

14. A switch according to claim 11 wherein the second pushbutton includes a heart cam groove formed in one side surface thereof and adapted to receive therein a second lock pin, the second lock pin being movable in the heart cam groove to lock the second pushbutton in a depressed position and to release it from that position upon re-depression thereof.

* * * * *

UNITED STATES PATENT AND TRADEMARK OFFICE
CERTIFICATE OF CORRECTION

PATENT NO. : 4,727,573

DATED : February 23, 1988

INVENTOR(S) : Toshio Kakuta and Tatsuo Kamitani

It is certified that error appears in the above-identified patent and that said Letters Patent is hereby corrected as shown below:

Claim 3, column 12, line 44, "fit" should be -- fitted --.

Signed and Sealed this

Second Day of August, 1988

Attest:

DONALD J. QUIGG

*Attesting Officer*   *Commissioner of Patents and Trademarks*